United States Patent
Lee (10) Patent No.: US 11,409,146 B2
(45) Date of Patent: Aug. 9, 2022

(54) DIGITAL INSTRUMENT CLUSTER COMPRISING DUAL DISPLAY PLASTIC LENS

(71) Applicant: HYUNDAI MOBIS CO., LTD., Seoul (KR)

(72) Inventor: Joung Hoon Lee, Yongin-si (KR)

(73) Assignee: HYUNDAI MOBIS CO., LTD., Seoul (KR)

(*) Notice: Subject to any disclaimer, the term of this patent is extended or adjusted under 35 U.S.C. 154(b) by 135 days.

(21) Appl. No.: 17/063,981

(22) Filed: Oct. 6, 2020

(65) Prior Publication Data
US 2021/0109396 A1   Apr. 15, 2021

(30) Foreign Application Priority Data
Oct. 15, 2019   (KR) .......................... 10-2019-0127537

(51) Int. Cl.
*G02F 1/1333*   (2006.01)
*G02F 1/13363*   (2006.01)
(Continued)

(52) U.S. Cl.
CPC ........ *G02F 1/133308* (2013.01); *B60K 35/00* (2013.01); *G02B 1/11* (2013.01); *G02B 1/18* (2015.01); *G02B 5/3083* (2013.01); *G02F 1/13338* (2013.01); *G02F 1/13363* (2013.01); *G02F 1/133502* (2013.01); *B60K 2370/1526* (2019.05); *B60K 2370/33* (2019.05); *B60K 2370/39* (2019.05); *B60K 2370/42* (2019.05);
(Continued)

(58) Field of Classification Search
CPC ......... G02F 1/133308; G02F 1/133314; G02F 1/133317; G02F 1/13363; G02F 1/13338; G02F 2202/28; G02B 5/3083; B60K 2370/1526
See application file for complete search history.

(56) References Cited

U.S. PATENT DOCUMENTS 7,319,504 B2   1/2008   Liu et al.
2013/0257685 A1*   10/2013   Kim ....................... G06F 1/1616
                                                              345/1.3
(Continued)

FOREIGN PATENT DOCUMENTS

DE   10 2017 210938   1/2019

OTHER PUBLICATIONS

German Office Action dated Jun. 30, 2021 issued in DE 10 2020 127 024.0.

*Primary Examiner* — Jia X Pan
(74) *Attorney, Agent, or Firm* — DLA Piper LLP (US)

(57) ABSTRACT

The present disclosure relates to a dual-display digital cluster for use with a vehicle, which includes a plastic lens having a plurality of curvatures, super retardation films (SRFs) adhered to a plurality of positions on a rear surface of the plastic lens by using an optically clear adhesive (OCA), a plurality of liquid crystal displays (LCDs) each adhered to rear surfaces of the super retardation films by using an optically clear resin (OCR), a carrier bezel configured to be assembled to a rear side of the plastic lens, to support the plurality of LCDs closely, and to prevent the plastic lens from being deformed, a rear cover assembled to a rear side of the carrier bezel, and at least one printed circuit board (PCB) disposed between the carrier bezel and the rear cover.

10 Claims, 13 Drawing Sheets

(51) Int. Cl.
  *B60K 35/00* (2006.01)
  *G02B 5/30* (2006.01)
  *G02F 1/1335* (2006.01)
  *G02B 1/11* (2015.01)
  *G02B 1/18* (2015.01)

(52) U.S. Cl.
  CPC .. *B60K 2370/816* (2019.05); *G02F 1/133331* (2021.01); *G02F 2201/465* (2013.01); *G02F 2202/28* (2013.01)

(56) References Cited

U.S. PATENT DOCUMENTS

2017/0361797 A1 12/2017 Weindorf
2018/0292710 A1* 10/2018 Takada ................. G02F 1/13363
2019/0219862 A1* 7/2019 Yoshida ............ G02F 1/133528

* cited by examiner (a)

DIGITAL INSTRUMENT CLUSTER COMPRISING DUAL DISPLAY PLASTIC LENS

CROSS-REFERENCE TO RELATED APPLICATION

This application is based on, and claims priority from, Korean Patent Application Number 10-2019-0127537, filed Oct. 15, 2019, the disclosure of which is incorporated by reference herein in its entirety.

TECHNICAL FIELD

The present disclosure in some embodiments relates to a digital cluster incorporating a dual-display plastic lens and optical bonding, which is disposed of in a cluster and a center fascia of a craft or vehicle.

BACKGROUND

The statements in this section merely provide background information related to the present disclosure and do not necessarily constitute prior art.

The dashboard instrument cluster, or simply cluster, provides various visual information concerning the driving state of the vehicle to the driver. Displayed on the cluster are vehicle speed, engine speed, fuel level, thermometer, and various warnings. Further, the center fascia is installed with a display that provides the driver with various additional convenience information, including navigations. The trend of delivering a smart vehicle leads to an increasing amount of the information supplied by the cluster.

In this circumstance, reading the dashboard information may be hindered by reflections of light toward the driver's gaze once it is incident at various angles into the cluster of a moving vehicle. The instrument cluster is surrounded by a visor that significantly reduces light entering the instrument panel. However, compared to the conventional analog type cluster, the digital cluster has a liquid crystal display (LCD) being disposed over a large area, increasing the probability of incident stray light that interferes with the driver's identification of the dashboard.

Most of the popular digital clusters still have a flat shape, but a high-end vehicle starts to employ a large front glass lens for the cluster with improved visibility, wherein the front lens is formed in a three-dimensionally curved surface to reduce the effect of reflected light. Glass lenses are easy to secure optical performance in harsh vehicle environments in terms of temperature, humidity, vibration, etc., but they suffer from high manufacturing cost for three-dimensional molding, which is a major setback known to popularization.

SUMMARY

As a solution to the above and other issues, the present disclosure in some embodiments provides a dual-display digital cluster for use with a vehicle, which includes a plastic lens having a plurality of curvatures, super retardation films (SRFs) adhered to a plurality of positions on a rear surface of the plastic lens by using an optically clear adhesive (OCA), a plurality of liquid crystal displays (LCDs) each adhered to rear surfaces of the super retardation films by using an optically clear resin (OCR), a carrier bezel configured to be assembled to a rear side of the plastic lens, to support the plurality of LCDs closely, and to prevent the plastic lens from being deformed, a rear cover assembled to a rear side of the carrier bezel, and at least one printed circuit board (PCB) disposed between the carrier bezel and the rear cover. Here, the plastic lens includes a high-gloss film pre-molded conforming to the plastic lens and is formed by an insert mold labeling (IML) process, and the carrier bezel includes a plurality of through-holes at positions corresponding to corners of each LCD for allowing an optically clear resin injected to pass into the carrier bezel and thereby affixing edges of each of the plurality of LCDs with the carrier bezel.

The plastic lens may be made with injection-induced residual stresses minimized by using an insert mold labeling molding along with pressurization while performing an injection compression molding (ICM).

The plastic lens may have a front surface including an anti-reflection (AR) coating layer and an anti-fingerprint (AF) coating layer, which may be formed by deposition in a vacuum.

The dual-display digital cluster may further include a touch film between a front surface of at least one of the LCDs and at least one of the super retardation films, which corresponds to at least one of the LCDs.

The carrier bezel may have a rear surface that is formed at least partially with a honeycomb structure for adding a bending strength to the carrier bezel.

The front edges of the plastic lens may have front edges formed to have rounded corners having a radius of 2 mm to 3 mm.

The plastic lens may include a plurality of male cantilever snap-fit joint parts protruding rearward along a circumference of the plastic lens, and the carrier bezel may include a plurality of female cantilever snap-fit joint parts at positions corresponding to the plurality of male cantilever snap-fit joint parts so that the male cantilever snap-fit joint parts engage the female cantilever snap-fit joint parts to join the plastic lens with the carrier bezel.

The dual-display digital cluster may further include a double-sided adhesive tape that is adhered to at least a portion of the rear surface of the plastic lens to join the plastic lens with the carrier bezel.

The carrier bezel may have a rear surface that further comprises a plurality of guide bosses, and the rear cover may include a plurality of guide holes corresponding to the guide bosses so that the guide bosses mate with the guide holes male to join and align the carrier bezel with the rear cover.

REFERENCE NUMERALS

| | |
|---|---|
| 1: dual-display digital cluster | 10: plastic lens |
| 21, 22: super retardation film | 31: first display |
| 32: second display | 40: carrier bezel |
| 51, 52: LCD bracket | 60: rear cover |
| 71, 72: circuit board | 91: touch film |
| 92: double-sided adhesive tape | 120: bend portion |
| 130: rounded corner | 132: rear surface |
| 140: male snap-fit joint part | 312: side surface |
| 410: honeycomb structure | 420: female snap-fit joint part |
| 430: through-hole | 440: LCD seat |
| 442: LCD-seat inner wall | 450: guide boss |
| 610: guide hole | 710: high-gloss film |
| 720, 730: mold | 740: movable mold portion |
| 810: optically clear resin | 820: gap |
| 910: screw | 920: nozzle |

DETAILED DESCRIPTION

The present disclosure in some embodiments provides a dual-display digital cluster which replaces a glass lens with a plastic lens for use as a three-dimensionally contoured frontside lens of the digital cluster, thereby reducing the manufacturing cost, providing sufficient durability and optical performance required for a digital cluster for a vehicle, and facilitating scaling up to a large-screen digital cluster.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, various terms such as first, second, A, B, (a), (b), etc., are used solely for the purpose of differentiating one component from others but not to imply or suggest the substances, the order, or sequence of the components. Throughout this specification, when a part "includes" or "comprises" a component, the part is meant to further include other components, not excluding thereof unless there is a particular description contrary thereto. The terms such as "unit," "module," and the like refer to units for processing at least one function or operation, which may be implemented by hardware, software, or a combination thereof.

Figure 1:
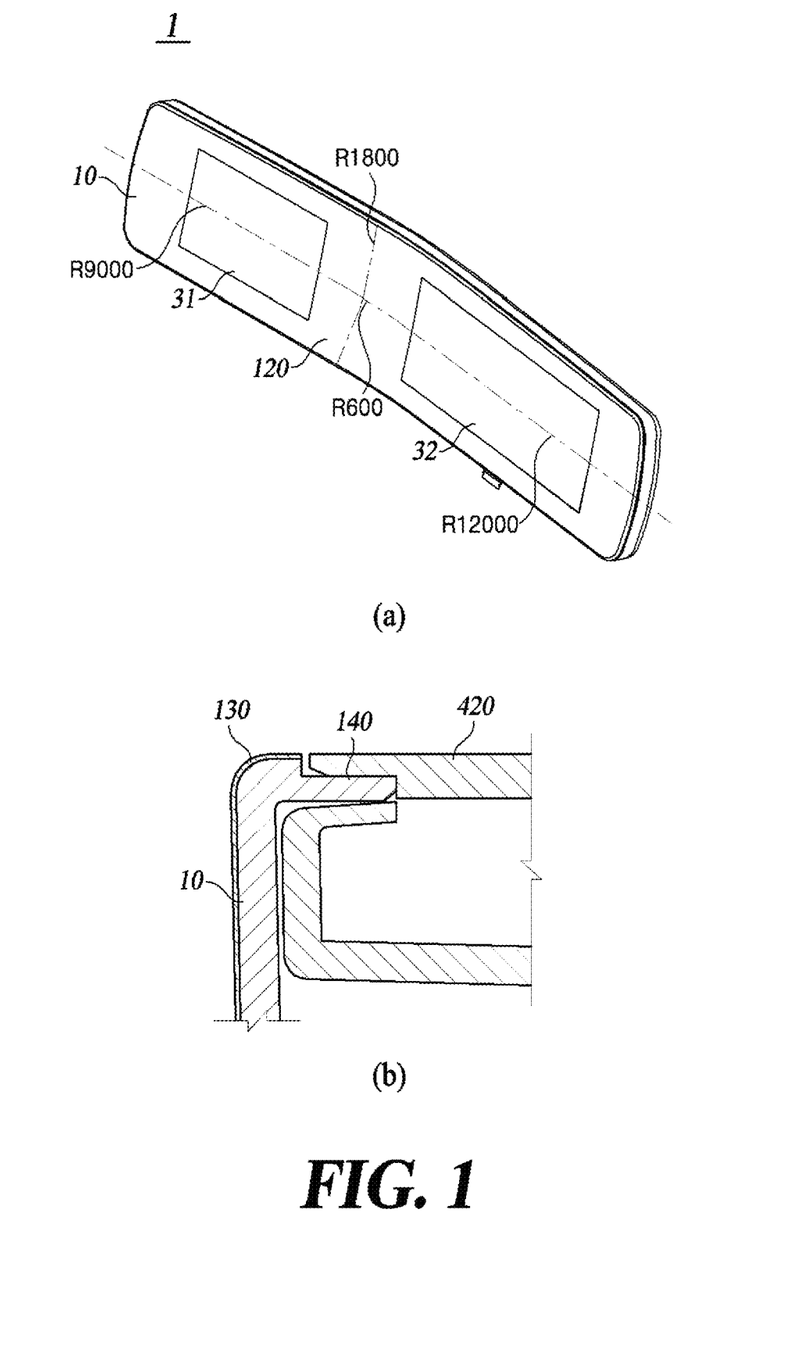
FIG. 1 is diagrams of a dual-display digital cluster, including a plastic lens having a plurality of curvatures according to at least one embodiment of the present disclosure.

FIG. 1 is diagrams of a dual-display digital cluster, including a plastic lens having a plurality of curvatures according to at least one embodiment of the present disclosure.

In FIG. 1 at (a), a digital cluster 1, according to at least one embodiment, is illustrated as including a dual-display and being disposed of in place of a cluster and a center fascia in front of a driver.

In the illustrated embodiment, a first display 31 is disposed of in place of the cluster, for displaying basic vehicle conditions, and a second display 32 is disposed of in place of the center fascia, for displaying various convenient information such as navigation data. A plastic lens 10 having a plurality of curvatures is disposed on the outermost surface facing the driver, that is, in front of the dual-display digital cluster 1.

Usually, the first and second displays 31 and 32 are arranged to face the driver. FIG. 1 shows at (a) that the right side of the digital cluster 1 is slightly more curved relative to the first display 31 toward the driver so that the second display 32 located on the right side faces the driver when viewed from the driver. A bend portion 120 is formed to have a relatively small radius of curvature indicated by R600 between the first and second displays 31 and 32 so that the second display 32 faces the driver. The plastic lens 10 is formed to be gently bent with a large radius of curvature (e.g., R9000 or R12000), while it employs an appropriate radius of curvature (e.g., R1800) in the vertical direction of the digital cluster 1 to constitute a concave lens. In this way, the plastic lens 10 may be configured to have a shape having a plurality of curvatures on the front face, thereby minimizing light incident on the front of the lens and reflected toward the driver.

The plastic lens 10 may easily be injection-molded. As shown in FIG. 1 at (b), the plastic lens 10 may have front side edges molded to have a rounded corner 130. The illustrated embodiment employs, for example, radius R2.5, and where necessary, it may have a radius value within the range of radii from R2 to R3 but is not limited thereto. The rounded corner 130 can contribute to preventing the digital cluster 1 from being easily damaged due to an impact applied thereto during a vehicle collision. A glass lens would need a significant increase in processing cost to implement the rounded corner 130, whereas the plastic lens 10 can implement the same at significantly less cost.

In addition, in at least one embodiment, an integrally molded member for assembly may be provided to protrude rearward from sides of the plastic lens 10. For example, FIG. 1 shows at (b) a male cantilever snap-fit joint part 140 integrally formed on the side of the plastic lens 10. These snap-fit joint parts, which are formed in a plurality of places along the side edges of the plastic lens 10, may be used to be easily assembled with supporting members configured to mate with the plastic lens 10 and thereby support the overall structure of the dual-display digital cluster 1.

Figure 2:
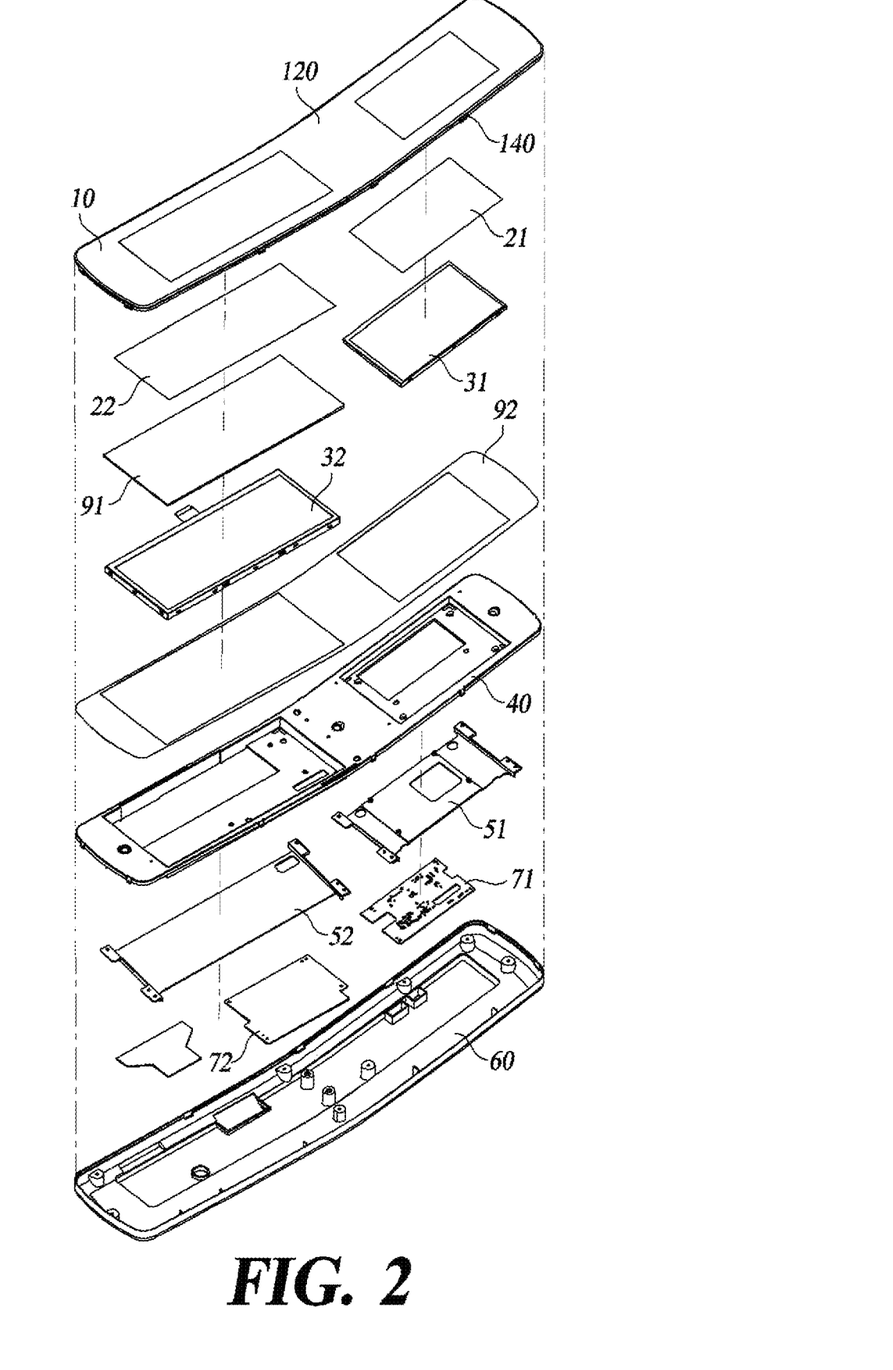
FIG. 2 is an exploded perspective view of a dual-display digital cluster according to at least one embodiment of the present disclosure.

FIG. 2 is an exploded perspective view of a dual-display digital cluster according to at least one embodiment of the present disclosure.

As shown in FIG. 2, the dual-display digital cluster 1, according to at least one embodiment, includes a plastic lens 10, super retardation films 21, 22, a touch film 91, LCDs in the form of first and second displays 31, 32, a double-sided adhesive tape 92, a carrier bezel 40, LCD brackets 51, 52, circuit boards 71, 72, and a rear cover 60. The illustrated embodiment exemplifies that the touch film 91 is disposed only on the second LCD 32 installed in place of a center fascia.

The plastic lens 10 may have a rear surface 132 to which the display is attached, and the attachment portions thereof may be flat or molded to have a single curvature in one direction. When the rear surface 132 is so partially molded to have a single curvature in one direction, the LCD employed therefor may be a flexible display.

Figure 3:
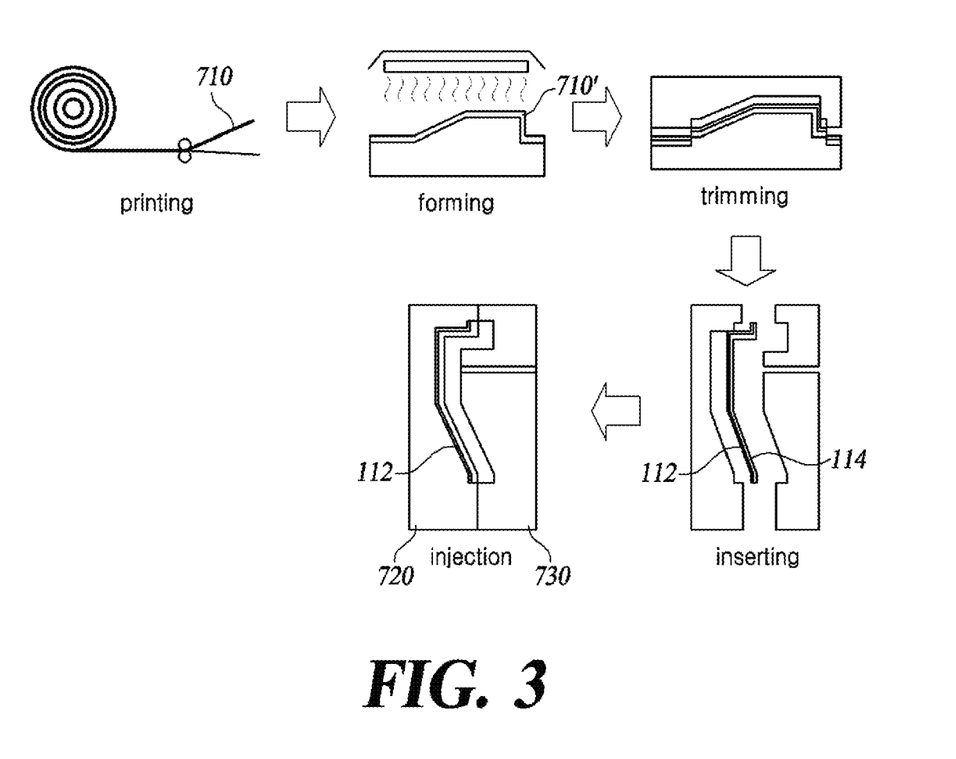
FIG. 3 illustrates an insert mold labeling (IML) molding process for molding a dual-display plastic lens according to at least one embodiment of the present disclosure.

FIG. 3 illustrates an insert mold labeling (IML) molding process for molding a dual-display plastic lens according to at least one embodiment of the present disclosure.

As shown in FIG. 3, the plastic lens 10, according to at least one embodiment, is molded by an insert mold labeling method that includes performing a pre-molding step on a high-gloss film 710 into the shape of a lens to provide near glass optical properties, inserting the lens-shaped high-gloss film 710 in molds 720 and 730, and performing injection molding after injecting plastic to the rear of the film 710 in the molds to produce the plastic lens 10. In this way, a hard-coated film stock can be used, and a considerable level of abrasion resistance can be secured. In addition, this molding process can utilize the same plastic lens mold 720, 730, with the film materials switched, allowing a small quantity batch production, which advantageously produces multiple types of plastic lens by small amounts.

The insert mold labeling molding employed renders the resultant plastic lens 10 according to at least one embodiment to have its front face provided with a partial pattern through printing or pattern-forming the high-gloss film 710 in advance. For example, the plastic lens 10 may be processed to be transparent with excellent light transmittance at an area where the LCD is disposed of, while it is opaque or translucent in other regions.

Figure 4:
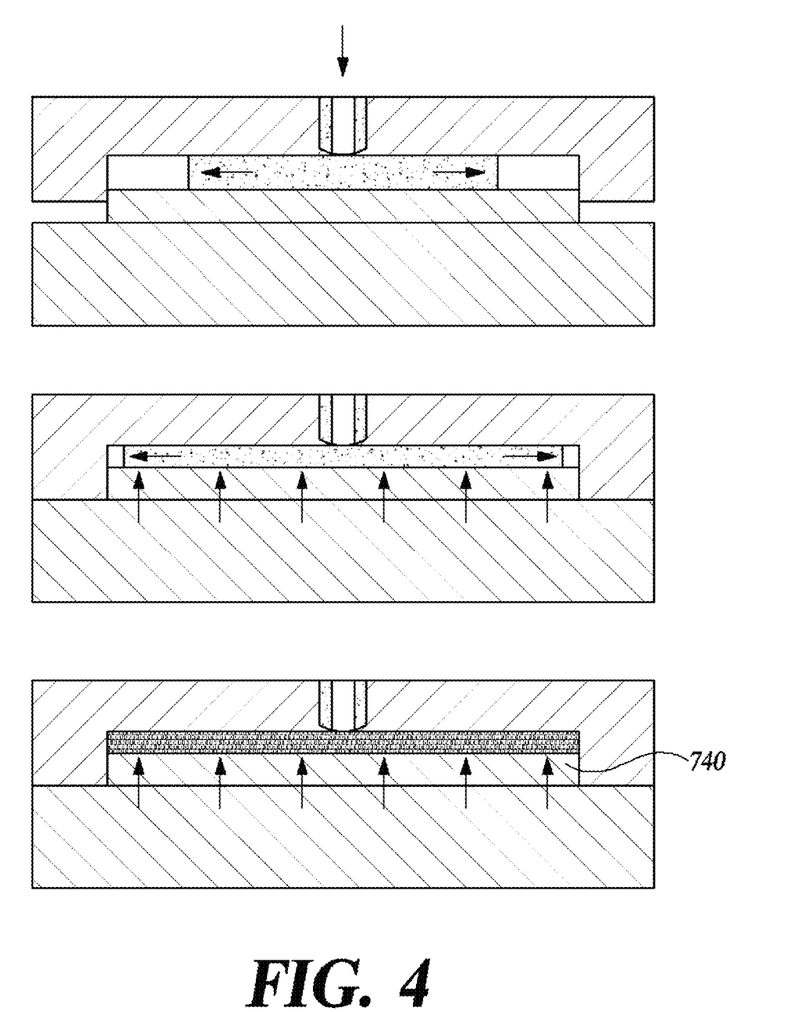
FIG. 4 illustrates an injection compression molding (ICM) process for molding a dual-display plastic lens according to at least one embodiment of the present disclosure.

FIG. 4 illustrates an injection compression molding (ICM) process for molding a dual-display plastic lens according to at least one embodiment of the present disclosure.

In FIG. 4, before the injected plastic material in molds is cured, a movable mold portion 740, which is at least a portion of the molds, moves to pressurize the plastic material, thereby minimizing the residual stress of the injection product that may occur during the injection and curing process. In this embodiment, the injection compression molding is performed along with the insert mold labeling. Accordingly, the density of the plastic lens 10 after molding can be more uniformly maintained over the entire body, and residual stress due to a variation in cooling rate due to the lens shape and mold structure can be minimized.

In the injection molding process, the material after filling the mold typically undergoes volume changes depending on the pressure, specific volume, and temperature until it is completely cured. Depending on the degrees of curing and cooling, interferences with the molds may cause the material to have residual stress. In particular, since the material in the liquid state has the coefficient of thermal expansion that is twice higher than that of the material in the solid-state, it is desirable to sufficiently pressurize the material when in the liquid state and minimize deformation due to a temperature gradient. In a liquid state of the material, the pressure caused by the movement of the movable mold portion 740 in the mold is uniformly applied to the material in the mold, which can minimize shrinkage and residual stress of the material.

Compared to the amorphous glass lens, the plastic lens 10 is susceptible to degraded optical properties even with a small difference in density or internal stress, so it is preferable to mold so that residual stress does not remain in the final molded product.

Additionally, in this embodiment, the thickness of the plastic lens 10 is preferably designed to be uniform as a whole. Furthermore, in injection compression molding, cooling and curing may be performed in separate steps. In particular, while the mold is kept at a uniform high temperature for a certain time, the material in the liquid state is pressurized to solidify the material. By exclusively arranging the curing of the material to complete before the subsequent cooling of the molded part through lowering the temperature, residual stress inside the part can be minimized, and the necessary properties thereof as an optical part can be secured.

Figure 5:
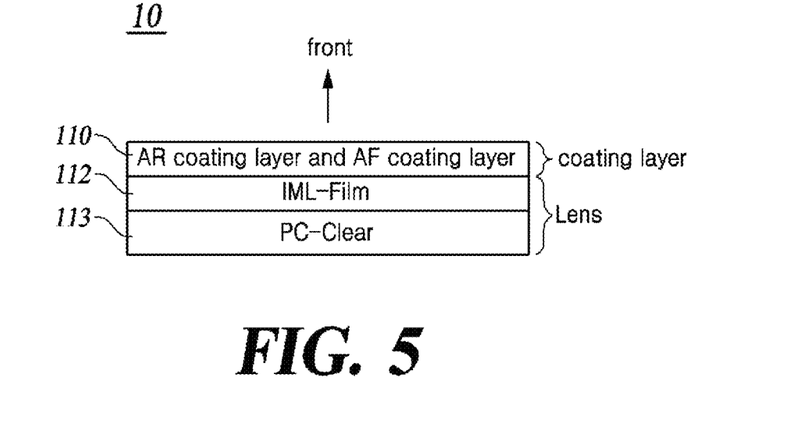
FIG. 5 illustrates a cross-sectional configuration of a dual-display plastic lens according to at least one embodiment of the present disclosure.

FIG. 5 illustrates a cross-sectional configuration of a dual-display plastic lens according to at least one embodiment of the present disclosure.

The plastic lens 10, upon completion of the molding, has its front face undergo vacuum deposition to form an anti-reflection (AR) coating layer and an anti-fingerprint (AF) coating layer. The AR coating layer may be formed to secure the light transmittance of the plastic lens 10 and improve reflectance (e.g., to be less than 1.5%). The AR coating layer may have a structure which is composed of a plurality of media stacked having different densities and features incident light being reflected at the interface of each medium and overlapping the reflected light beams with different phases to cancel each other, thereby reducing the final amount of reflected light. In this embodiment, the AF coating layer prevents contamination of the surface of the plastic lens 10 disposed of in place of the center fascia where the touch film 91 is added, so that visibility is not lowered.

Figure 6:
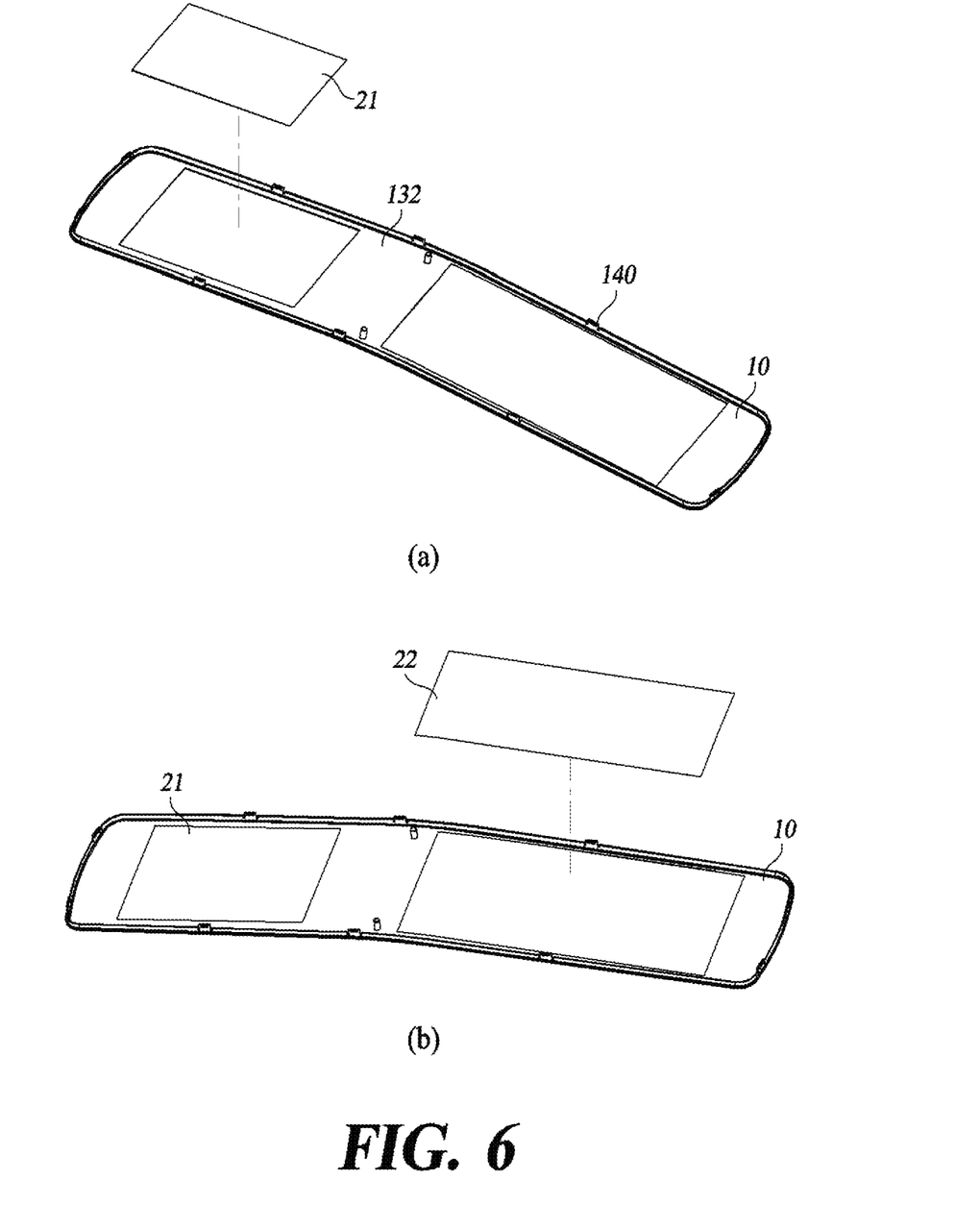
FIG. 6 illustrates a process of attaching super retardation films (SRFs) to the rear surface of a dual-display plastic lens according to at least one embodiment of the present disclosure.

FIG. 6 illustrates a process of attaching super retardation films (SRFs) to the rear surface of a dual-display plastic lens according to at least one embodiment of the present disclosure.

On the front of the LCDs 31 and 32, polarized light is configured and utilized in a complex form to improve clarity and viewing angle. When the driver wears sunglasses with polarization function and gazes at the LCDs 31 and 32, the image displayed on the LCDs 31 and 32 may appear as a rainbow-shaped blob due to complex polarization conditions. In the plastic lens 10, internal stress may add a phase difference or retardation to the transmitted light, resulting in birefringence, and thereby such distortion may be more pronounced. In this embodiment, to avoid this phenomenon, the super retardation films 21 and 22 are disposed between the rear surface 132 of the plastic lens 10 and the LCDs 31, 32.

The super retardation films 21 and 22 are bonded to the rear surface 132 of the plastic lens 10 through direct bonding by using an optically clear adhesive (OCA). In this way, the plastic lens 10 and the super retardation films 21, 22 can act as a unitary optical element.

Compared with a conventional retardation film having an in-plane retardation (Re) level of 500 nm to 1,000 nm, the super retardation films 21, 22 may feature the in-plane retardation that ranges from 8,000 nm to 11,000 nm. The in-plane retardation (Re) is a value defined as in Equation 1 below where the thickness of the film is defined as d, the refractive index nx in the in-plane slow axis direction, and the refractive index in the in-plane fast axis direction as ny.

$$Re=(nx-ny)*d \qquad \text{Equation 1}$$

Figure 7:
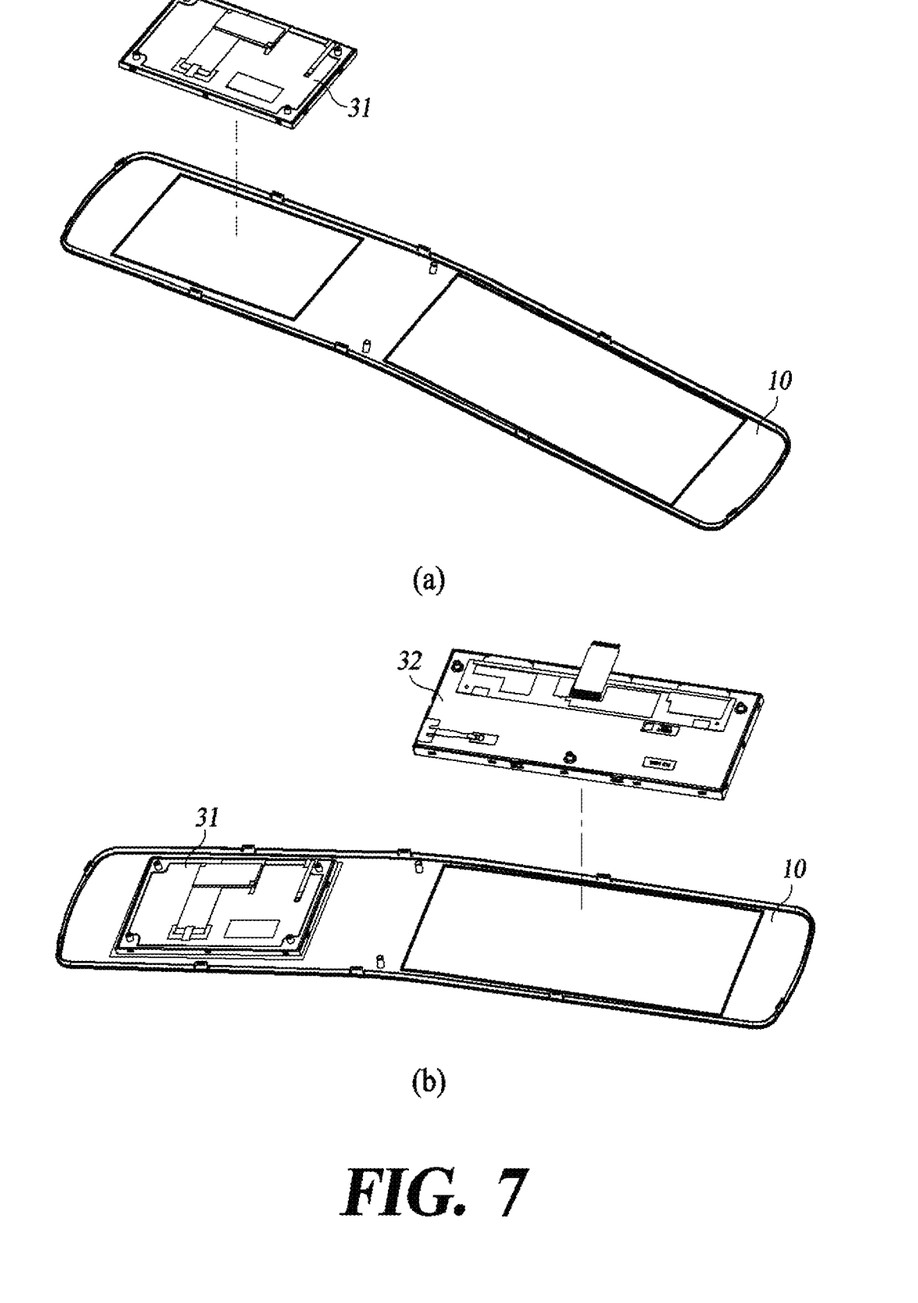
FIG. 7 illustrates a process of bonding liquid crystal displays (LCDs) to super retardation films according to at least one embodiment of the present disclosure.

FIG. 7 illustrates a process of bonding LCDs to super retardation films according to at least one embodiment of the present disclosure.

The LCDs 31, 32 are bonded to the rear surfaces of the super retardation films 21, 22 by using optically clear resin (OCR) to enable the plastic lens 10 to work as a unitary optical element up to the LCDs 31, 32 and to minimize reflection at the bonding surface. The LCDs 31, 32 and the super retardation films 21, 22 may be bonded together by applying the OCR to the rear of the super retardation films 21, 22 or the front of the LCDs 31, 32, attaching the LCDs 31, 32 to the rear of the super retardation films 21, 22, and curing the OCR after removing air bubbles that may exist inside thereof.

In at least one embodiment, the touch film 91 may be further provided on the front of the second LCD 32 disposed of in place of the center fascia, which is bonded to the rear surface 132 of the plastic lens 10 to receive touch input from a user.

Figure 8:
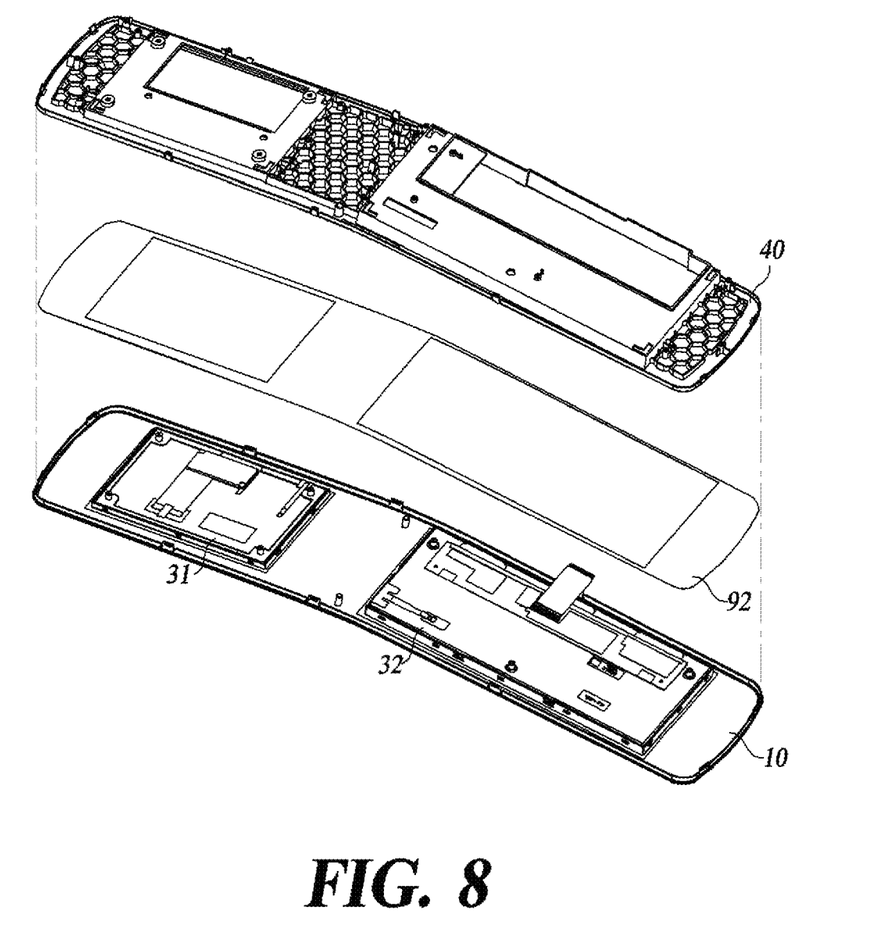
FIG. 8 illustrates a process of assembling a dual-display plastic lens and a carrier bezel according to at least one embodiment of the present disclosure.

FIG. 8 illustrates a process of assembling a dual-display plastic lens and a carrier bezel according to at least one embodiment of the present disclosure.

The plastic lens 10 used for optics is disadvantageous to be formed thicker than the glass lens. Between liquid and solid states, plastic material exhibits a large difference in thermal expansion and heat transfer characteristics, and it is liable to be malformed in the end due to uneven thickness of the designed shape of the plastic lens 10 and thus uneven cooling rates in the mold. Therefore, the plastic lens 10, according to the present disclosure, is optically preferable to be made thin, which compromises rigidity compared to the glass lens.

Figure 9:
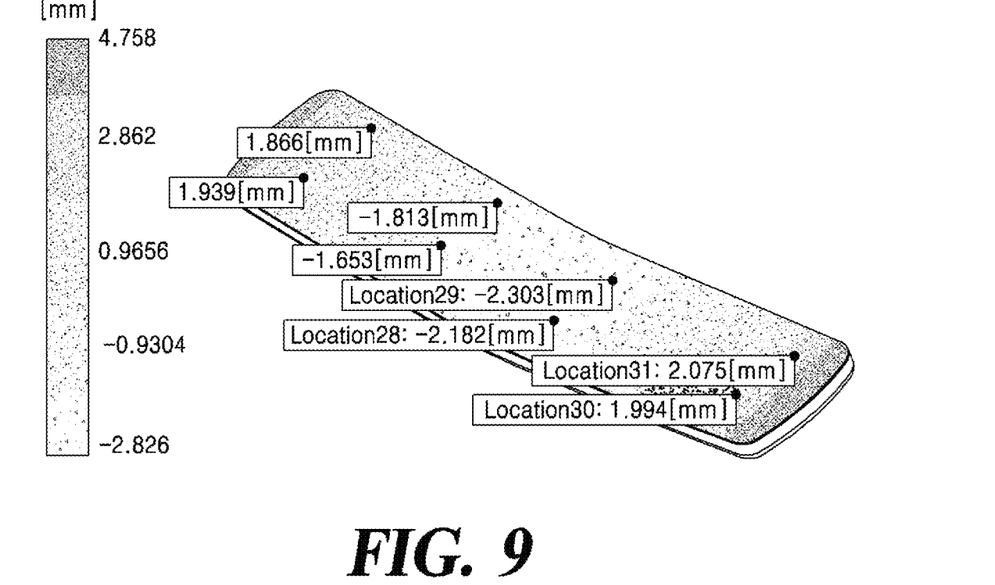
FIG. 9 illustrates a computational simulation of deformation after molding a plastic lens having a plurality of curvatures.

FIG. 9 illustrates a computational simulation of deformation after molding a plastic lens having a plurality of curvatures.

Illustrated in FIG. 9 is a result of the computational simulation of the deformation of the molded article after injection, the plastic lens 10 in this case, exhibiting a large lens having a comparably small thickness, whereby a considerable deformation is estimated.

Figure 10:
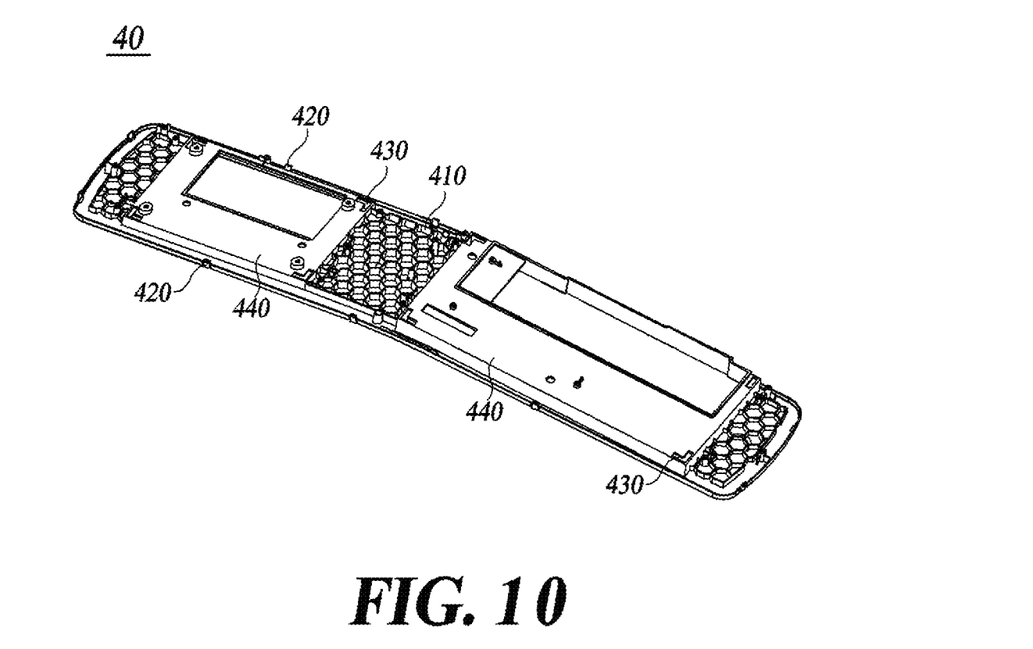
FIG. 10 illustrates a carrier bezel having a reinforced flexural rigidity with its rear surface incorporating a honeycomb structure, according to at least one embodiment of the present disclosure.

FIG. 10 illustrates a carrier bezel having a reinforced flexural rigidity with its rear surface incorporating a honeycomb structure, according to at least one embodiment of the present disclosure.

The carrier bezel 40, according to this embodiment, is formed to have high structural rigidity and is combined with the plastic lens 10 to maintain the designed shape thereof. As shown in FIG. 10, except for LCD seats 440 that are provided in the carrier bezel 40 in the form of front pockets to accommodate the LCDs 31, 32, the rear area of the carrier bezel 40 forms a honeycomb structure 410 shown as a means for weight reduction while providing the carrier bezel 40 with the sufficiently high rigidity against bending.

Referring back to FIG. 8, between the front surface of the carrier bezel 40 and the plastic lens 10, the double-sided adhesive tape 92 is placed to join the two sides in an area other than where the LCDs 31, 32 are disposed of. Further, a plurality of male snap-fit joint parts 140 and female snap-fit joint parts 420 may be included in the rim of the plastic lens 10 and the rim of the carrier bezel 40 at positions corresponding to each other. The rim of the carrier bezel 40 may be mechanically joined to the rim of the plastic lens 10 to maintain the shape of the plastic lens 10 firmly.

Figure 11:
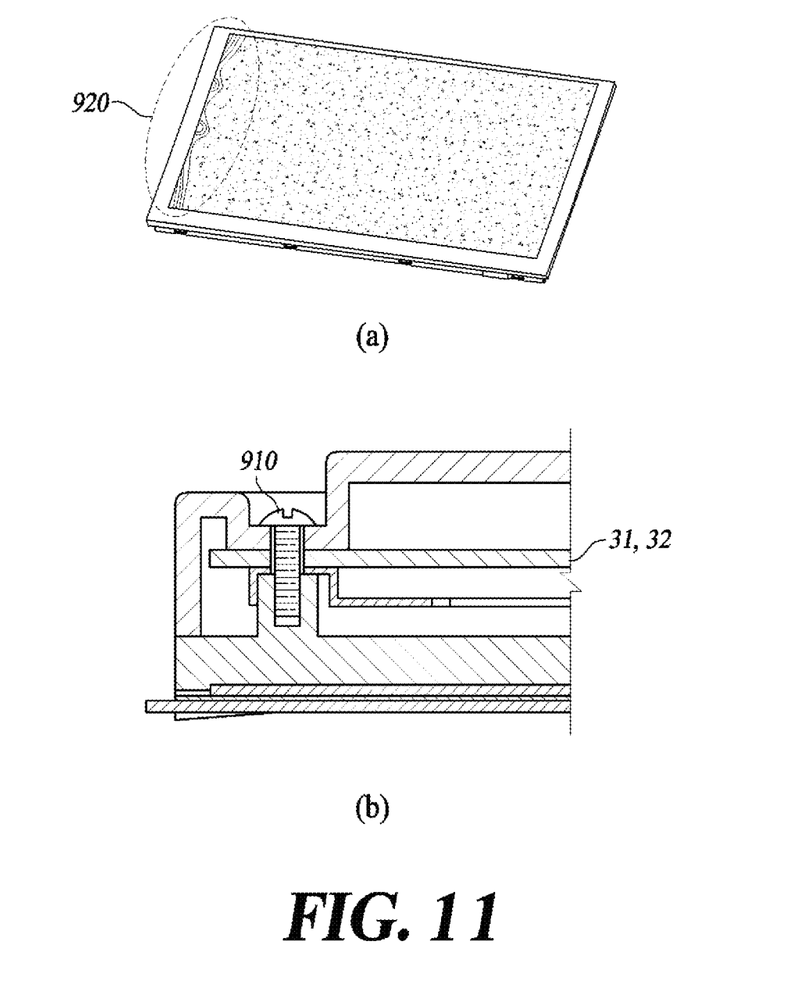
FIG. 11 illustrates a Mura issue that may occur when an LCD is mechanically assembled on a carrier bezel in general.

FIG. 11 illustrates a Mura issue that may occur when an LCD is mechanically assembled on a carrier bezel in general.

As shown in FIG. 11 at (a), a Mura issue refers to a phenomenon in which the edge portion of the LCD screen appears to be white, and it may be caused by a defect in the LCD itself as well as mechanical stress, vibration, impact force, bend, etc. applied to the panels of LCDs 31, 32. Using a fastener like a screw 910 as shown in FIG. 11 at (b) for mechanically fixing the panels of LCDs 31 and 32 introduces an external force acting as described above to cause a Mura issue.

To prevent Mura issue, an optically clear resin is partially applied and cured between the rear of the LCDs 31, 32 and the carrier bezel 40, thereby fix them together. After curing, the optically clear resin 810 has an elasticity to some extent and can absorb thermal expansion and vibration.

Figure 12:
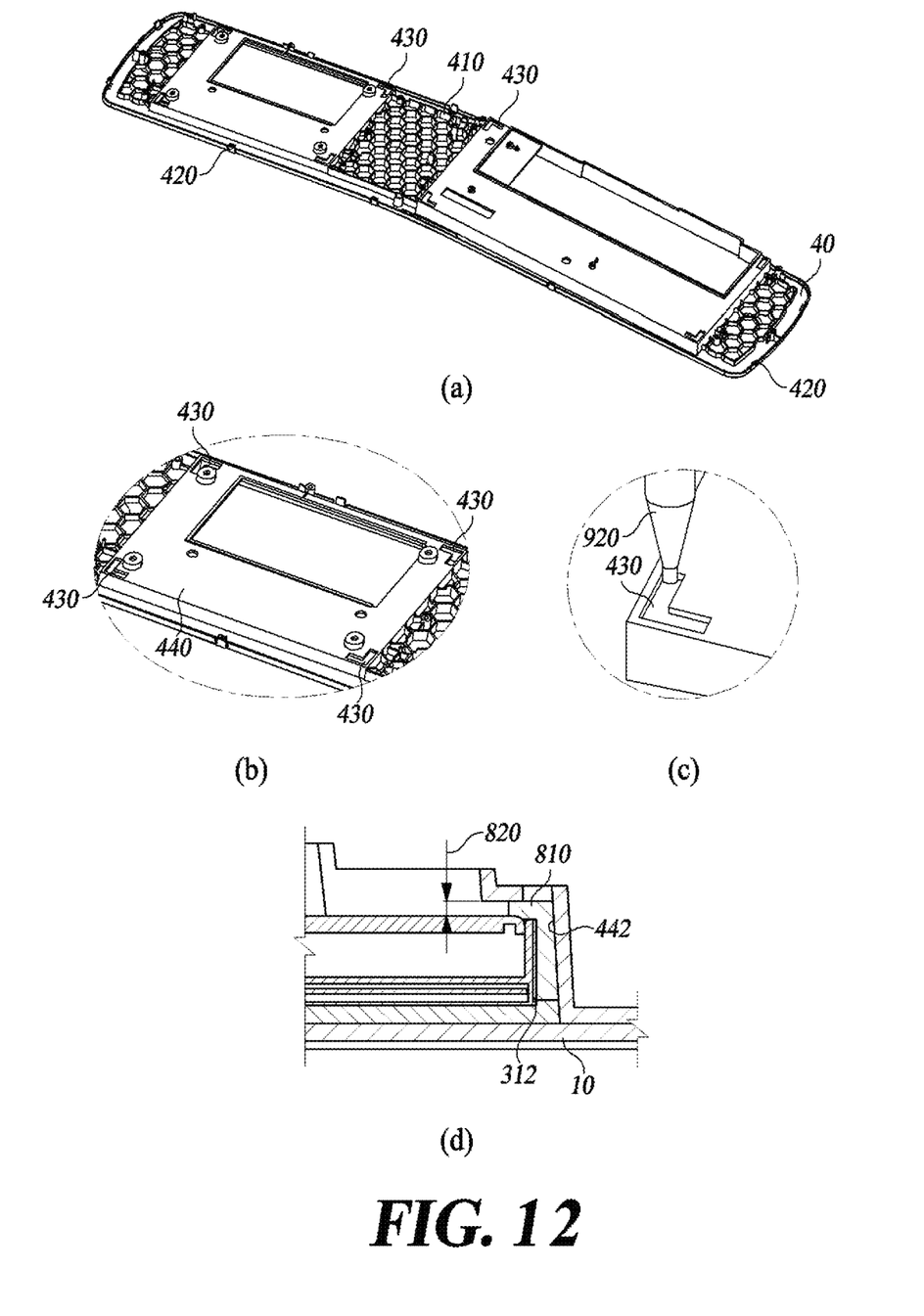
FIG. 12 is diagrams of through-holes included in a carrier bezel and a process of fixing an LCD and the carrier bezel by injecting an optically clear resin (OCR) through the through-holes according to at least one embodiment of the present disclosure.

FIG. 12 is diagrams of through-holes included in a carrier bezel and a process of fixing an LCD and the carrier bezel by injecting an optically clear resin (OCR) through the through-holes according to at least one embodiment of the present disclosure.

As shown in FIG. 12 at (a), the carrier bezel 40 includes through-holes 430 in its points corresponding to four corners of each of the two LCDs 31, 32 that are disposed of. The through-holes 430 are formed adjacent to the four corners of each of the LCD seats 440 formed in the carrier bezel 40 to accommodate the LCDs 31, 32. The carrier bezel 40 is configured so that, once it is assembled with the plastic lens 10, the LCD seats 440 thereof for accommodating the LCDs 31, 32 have their bottom spaced by gaps 820 from the rear surfaces of the LCDs 31, 32.

A shown in FIG. 12 at (b), the through-holes are adjacent to the four corners of the LCD and has a shape of 'I', although other various configurations are envisioned.

As shown in FIG. 12 at (c), after the carrier bezel 40 and the plastic lens 10 are assembled, the optically clear resin is injected through the LCD seats 440 at the through-holes 430 by using a nozzle 920. The gaps 820 between the bottom of the LCD seats 440 and the rear surfaces of the LCDs 31, 32 may be selected in consideration of the viscosity of the optically clear resin. In other words, the optically clear resin may be selected to have such a viscosity that keeps the optically clear resin 810 during the resin working time before being cured from further flowing while filling the gap 820 once it fills up the space between side surfaces 312 of the LCDs 31, 32 and inner walls 442 of the LCD seat 440. FIG. 12 (d) is a cross-sectional view of the optically clear resin 810 filled and cured in this way.

Figure 13:
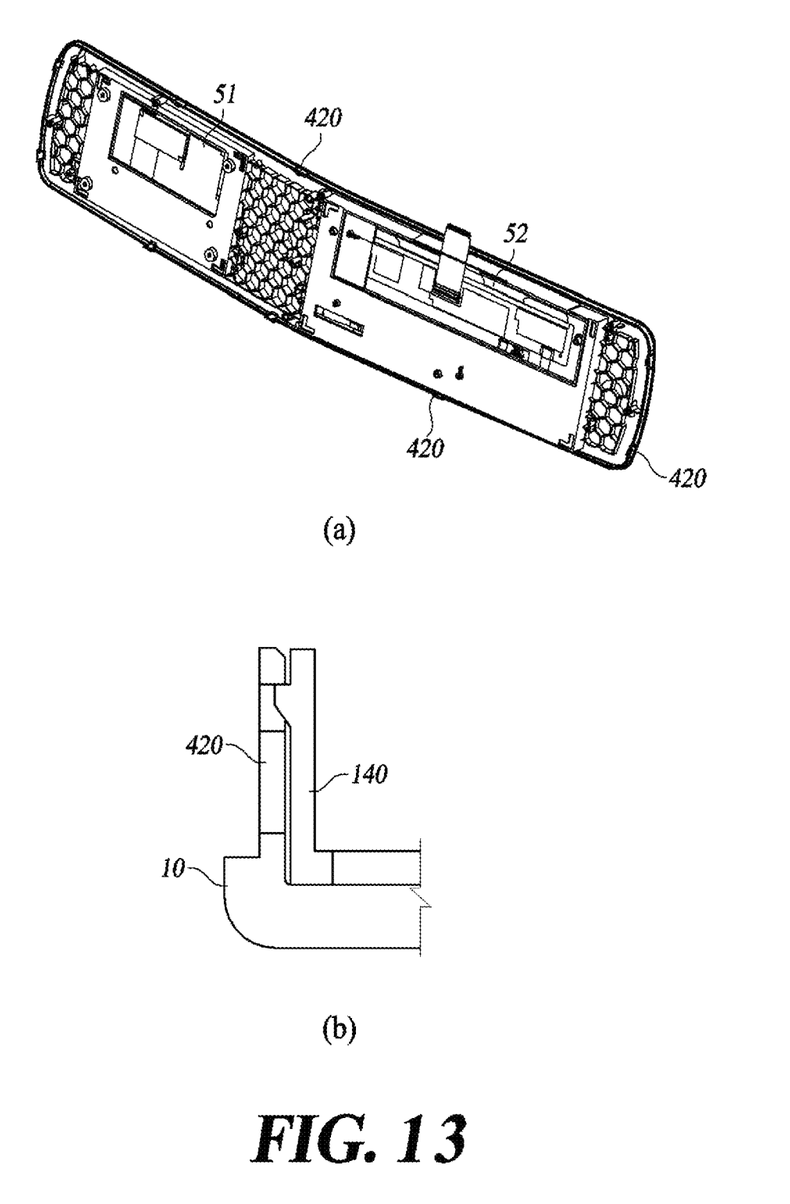
FIG. 13 illustrates cantilever snap-fit joints included in a dual-display plastic lens according to at least one embodiment of the present disclosure.

FIG. 13 illustrates cantilever snap-fit joints included in a dual-display plastic lens according to at least one embodiment of the present disclosure.

As shown in FIGS. 8 and 13, the plastic lens 10 and the carrier bezel 40 are joined with the double-sided adhesive tape 92 and the cantilever snap-fit joint parts 140 and 420 at their edge portions.

The plastic lens 10 includes a plurality of male cantilever snap-fit joint parts 140 protruding rearward along its periphery. The carrier bezel 10 is formed with a plurality of female cantilever snap-fit joint parts 420 at positions corresponding to the plurality of male cantilever snap-fit joint parts 140. The male and female cantilever snap-fit joint parts 140 and 420 may be disposed of interchangeably.

Figure 14:
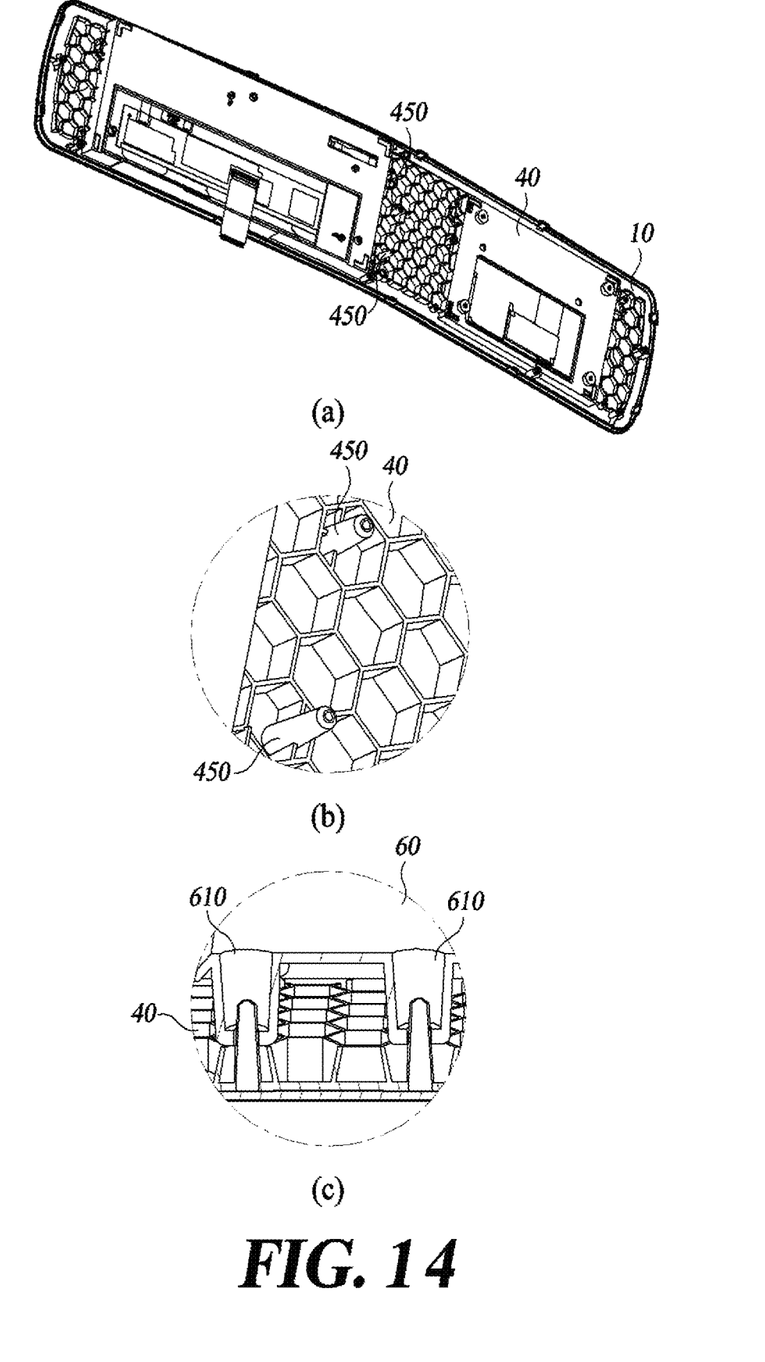
FIG. 14 is diagrams of guide bosses that are included on the rear surface of the carrier bezel and provide assembly alignment with a rear cover according to at least one embodiment of the present disclosure.

FIG. 14 is diagrams of guide bosses that are included on the rear surface of the carrier bezel and provide assembly alignment with a rear cover according to at least one embodiment of the present disclosure.

The carrier bezel 40 may further include a plurality of guide bosses 450 on the rear thereof. The guide bosses 450 may be configured to cooperate with a plurality of guide holes 610 provided in the rear cover 60 to facilitate assembly and alignment of the carrier bezel 40 with the rear cover 60.

The embodiments of the present invention can easily provide a large three-dimensional shape lens by using a plastic lens as a lens on the front of LCDs, and the lens can be integrally molded with cantilever snap-fit joints for fixing with the digital cluster body, which effects a greatly reduced manufacturing cost.

Additionally, excellent optical properties are provided by performing the insert mold labeling molding so that a pre-molded high-gloss film is disposed on the front of the lens and performing the compression molding during the injection. An anti-reflection (AR) and anti-fingerprint (AF) coating layers are formed on the front surface of the lens by deposition in a vacuum, which can reduce the reflection of stray light. A super retardation film (SRF) is incorporated between the rear surface of the lens and the LCDs to reduce birefringence due to the internal stress of the injected plastic or other causes.

Further, the plastic lens is rearwardly supported by a carrier bezel of high rigidity, including a honeycomb structure to prevent deformation due to residual stress during and/or after injection. Additionally, the optically clear resin (OCR) that is filled through the carrier bezel fixes the rear and side surfaces of the four corners of each LCD, which can suppress stress generation due to temperature changes and vibrations in the vehicle environment and thereby prevents light leaks and the Mura Issue from occurring.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A dual-display digital cluster for use with a vehicle, comprising:
   a plastic lens having a plurality of curvatures;
   super retardation films (SRFs) adhered to a plurality of positions on a rear surface of the plastic lens by using an optically clear adhesive (OCA);
   a plurality of liquid crystal displays (LCDs) each adhered to rear surfaces of the super retardation films by using an optically clear resin (OCR);
   a carrier bezel configured to be assembled to a rear side of the plastic lens, to support the plurality of LCDs closely, and to prevent the plastic lens from being deformed;
   a rear cover assembled to a rear side of the carrier bezel; and
   at least one printed circuit board (PCB) disposed between the carrier bezel and the rear cover,
   wherein the plastic lens comprises a high-gloss film pre-molded conforming to the plastic lens and is formed by an insert mold labeling (IML) process, and
   the carrier bezel includes a plurality of through-holes at positions corresponding to corners of each LCD for allowing an optically clear resin injected to pass into the carrier bezel and thereby affixing edges of each of the plurality of LCDs with the carrier bezel.

2. The dual-display digital cluster of claim 1, wherein the plastic lens is made with injection-induced residual stresses minimized by using an insert mold labeling molding along with pressurization while performing an injection compression molding (ICM).

3. The dual-display digital cluster of claim 2, wherein the plastic lens has a front surface comprising an anti-reflection (AR) coating layer and an anti-fingerprint (AF) coating layer which are formed by deposition in a vacuum.

4. The dual-display digital cluster of claim 1, further comprising:
   a touch film between a front surface of at least one of the LCDs and at least one of the super retardation films, which corresponds to the at least one of the LCDs.

5. The dual-display digital cluster of claim 1, wherein the carrier bezel has a rear surface that is formed at least partially with a honeycomb structure for adding a bending strength to the carrier bezel.

6. The dual-display digital cluster of claim 1, wherein front edges of the plastic lens are formed to have rounded corners having a radius of 2 mm to 3 mm.

7. The dual-display digital cluster of claim 1, wherein the plastic lens includes a plurality of male cantilever snap-fit joint parts protruding rearward along a circumference of the plastic lens, and the carrier bezel includes a plurality of female cantilever snap-fit joint parts at positions corresponding to the plurality of male cantilever snap-fit joint parts so that the male cantilever snap-fit joint parts engage the female cantilever snap-fit joint parts to join the plastic lens with the carrier bezel.

8. The dual-display digital cluster of claim 7, further comprising:
   a double-sided adhesive tape that is adhered to at least a portion of the rear surface of the plastic lens to join the plastic lens with the carrier bezel.

9. The dual-display digital cluster of claim 1, wherein the carrier bezel has a rear surface that further comprises a plurality of guide bosses, and the rear cover comprises a plurality of guide holes corresponding to the guide bosses so that the guide bosses mate with the guide holes male to join and align the carrier bezel with the rear cover.

10. The dual-display digital cluster of claim 1, wherein the plastic lens has a front surface comprising an anti-reflection (AR) coating layer and an anti-fingerprint (AF) coating layer which are formed by deposition in a vacuum.

* * * * *